(12) United States Patent
Araki et al.

(10) Patent No.: US 7,754,799 B2
(45) Date of Patent: Jul. 13, 2010

(54) MAGNESIUM ALLOY-BONDING ORGANOPOLYSILOXANE COMPOSITION HAVING IMPROVED CHEMICAL RESISTANCE

(75) Inventors: Tadashi Araki, Annaka (JP); Mamoru Teshigawara, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 572 days.

(21) Appl. No.: 11/699,994

(22) Filed: Jan. 31, 2007

(65) Prior Publication Data

US 2007/0179244 A1 Aug. 2, 2007

(30) Foreign Application Priority Data

Feb. 1, 2006 (JP) .............................. 2006-024108

(51) Int. Cl.
*C08K 3/22* (2006.01)
*C08K 3/26* (2006.01)

(52) U.S. Cl. ...................... 524/425; 524/432; 523/212; 523/200

(58) Field of Classification Search ................. 524/731, 524/432, 425; 523/212, 200
See application file for complete search history.

(56) References Cited

U.S. PATENT DOCUMENTS

| | | | |
|---|---|---|---|
| 4,973,644 A * | 11/1990 | Onishi et al. .................. 528/15 |
| 5,527,932 A | 6/1996 | Kasuya | |
| 6,403,711 B1 * | 6/2002 | Yang et al. ................... 525/100 |
| 6,645,339 B1 | 11/2003 | DeCato | |
| 6,875,806 B2 * | 4/2005 | Araki et al. .................. 524/430 |
| 2005/0228091 A1 | 10/2005 | Kimura et al. | |

FOREIGN PATENT DOCUMENTS

| | | |
|---|---|---|
| EP | 1 584 648 A1 | 10/2005 |
| JP | 2002-309219 A | 10/2002 |
| JP | 2003-535152 A | 11/2003 |
| JP | 2005-298558 A | 10/2005 |
| WO | WO 01/36537 A1 | 5/2001 |

OTHER PUBLICATIONS

European Search Report dated Jun. 11, 2007, issued in corresponding European patent application No. 07 001895.

* cited by examiner

*Primary Examiner*—Margaret G Moore
(74) *Attorney, Agent, or Firm*—Westerman, Hattori, Daniels & Adrian, LLP

(57) ABSTRACT

An organopolysiloxane composition suited for magnesium alloy bonding comprises (A) a specific organopolysiloxane, (B) a non-reactive silicone oil, (C) zinc oxide surface treated with a silane or siloxane treating agent, (D) heavy calcium carbonate surface treated with a paraffin treating agent, (E) an organosilicon compound having at least three hydrolyzable radicals or a partial hydrolyzate thereof, (F) a silane coupling agent having at least one epoxy radical, and (G) a titanium chelate catalyst. The composition has improved chemical resistance.

3 Claims, No Drawings

MAGNESIUM ALLOY-BONDING ORGANOPOLYSILOXANE COMPOSITION HAVING IMPROVED CHEMICAL RESISTANCE

CROSS-REFERENCE TO RELATED APPLICATION

This non-provisional application claims priority under 35 U.S.C. §119(a) on Patent Application No. 2006-024108 filed in Japan on Feb. 1, 2006, the entire contents of which are hereby incorporated by reference.

TECHNICAL FIELD

This invention relates to an organopolysiloxane composition which is curable at room temperature, adherent to magnesium alloys and resistant to chemicals.

As used herein, the term "chemical resistance" means that a material maintains excellent physical properties and adhesion in a chemical resistance test, typically using automobile-related fluids including engine oil, gear oil, automatic transmission oil, and long-life coolants.

BACKGROUND ART

Due to their light weight, strength, corrosion resistance, freedom of design and recyclability, magnesium alloys as typified by AZ-31 and AZ-91 are recently used in a wide variety of applications including information electronic equipment such as mobile phones, digital video cameras, digital cameras, liquid crystal projectors, plasma displays, personal computers, MD players, DVD recorders, and vehicle components, typically automotive components such as electric and electronic parts, oil pans, intake manifolds, lock housing parts, steering upper brackets, and steering wheels. It would be desirable to have an organopolysiloxane composition which is self-adhesive to magnesium alloy members.

Magnesium alloy members, however, are extremely difficult to bond. Prior to bonding, they must be modified by chemical treatment. Few studies have been made on sealing materials and adhesives which are self-adhesive to magnesium alloy members without a need for such treatment. For organopolysiloxane compositions which are self-adhesive to magnesium alloys, only a few techniques have been proposed. U.S. Pat. No. 6,645,339 (corresponding to JP-A 2003-535152) discloses a composition comprising a curable silicone, an amino-containing silane adhesion promoter, and a filler; and JP-A 2002-309219 discloses a composition comprising a silicone oil and an inorganic compound containing a metal element having a higher standard electrode potential than magnesium as a filler. As to the former, the amino-containing silane adhesion promoters such as γ-aminopropyltrialkoxysilane and trialkoxypropylethylenediamine are less effective. The latter composition, which essentially contains a hydroxyl end-capped organopolysiloxane or methoxy end-capped organopolysiloxane, lacks chemical resistance, especially durable physical properties against automobile long-life coolant aqueous solution. As used herein, the term "durable physical properties" refer to the maintenance of rubber physical properties after a chemical resistance test.

The latest technology is found in JP-A 2005-298558. For improving the adhesion to magnesium alloy of an organopolysiloxane composition, it proposes to use an acidic silane coupling agent which exhibits pH 7 or lower in a 5% aqueous solution thereof. The use of acidic silane coupling agent, however, can cause corrosion to the magnesium alloy due to the acidity thereof so that the magnesium alloy itself loses strength. After a chemical resistance test (especially in engine oil, gear oil and automatic transmission oil), the composition loses adhesion to magnesium alloy. In addition, since there are available only a few types of acidic silane coupling agents, the composition lacks the freedom of material design and is uneconomical.

SUMMARY OF THE INVENTION

An object of the present invention is to provide an organopolysiloxane composition which is fully adherent to magnesium alloys, and has chemical resistance which has never been achieved with prior art one-part RTV organopolysiloxane compositions, especially a sufficient chemical resistance to maintain good rubber physical properties and adhesion against engine oil, gear oil, automatic transmission oil, and long-life coolant aqueous solution.

The inventors have found that by combining a silethylene bond-bearing, methoxy end-capped organopolysiloxane, zinc oxide which is surface treated with a silane or siloxane treating agent, heavy calcium carbonate which is surface treated with a paraffin treating agent, and a silane coupling agent having an epoxy radical in the molecule, a composition is obtained which is resistant against chemicals, especially the above-described fluids and fully adherent to magnesium alloys.

The invention provides an organopolysiloxane composition intended for magnesium alloy bonding and having improved chemical resistance. The composition comprises the following components:

(A) 100 parts by weight of an organopolysiloxane having the general formula (1):

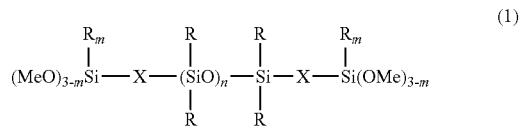

wherein R is each independently a substituted or unsubstituted monovalent hydrocarbon radical of 1 to 10 carbon atoms, X is an oxygen atom or an alkylene radical of 2 to 5 carbon atoms, Me is methyl, n is an integer of at least 10, and m is each independently 0 or 1, or an organopolysiloxane having the general formula (2):

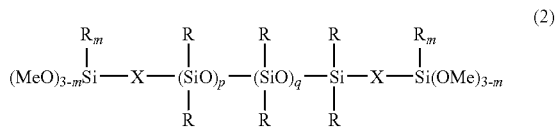

wherein R, Me, X and m are as defined above, p is an integer of at least 10, q is an integer of 1 to 5, and $R^1$ is a branching chain containing hydrolyzable radicals of the formula (3):

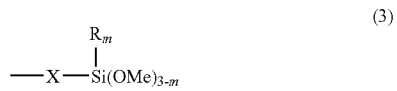

wherein R, Me, X and m are as defined above, or a mixture thereof, (B) 1 to 50 parts by weight of a non-reactive silicone oil, (C) 20 to 100 parts by weight of zinc oxide which is surface treated with a silane or siloxane treating agent, (D) 20 to 100 parts by weight of heavy calcium carbonate which is surface treated with a paraffin treating agent, (E) 0.1 to 30 parts by weight of an organosilicon compound having at least three hydrolyzable radicals each bonded to a silicon atom in the molecule or a partial hydrolyzate thereof, (F) 0.1 to 10 parts by weight of a silane coupling agent having at least one epoxy radical in the molecule, and (G) an effective amount of a titanium chelate catalyst.

BENEFITS OF THE INVENTION

The organopolysiloxane composition of the present invention is fully adherent to magnesium alloys, and has chemical resistance which has never been achieved with prior art one-part RTV organopolysiloxane compositions, especially a sufficient chemical resistance to maintain good rubber physical properties and adhesion against engine oil, gear oil, automatic transmission oil, and long-life coolant aqueous solution.

DESCRIPTION OF THE PREFERRED EMBODIMENTS

Component A

Component (A) is an organopolysiloxane having the general formulas (1) or (2) or a mixture thereof. It is essential for the composition to gain good chemical resistance, and especially durable physical properties against long-life coolant aqueous solution.

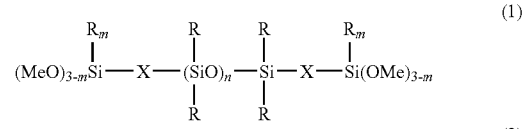

Herein R, which may be the same or different, is a substituted or unsubstituted monovalent hydrocarbon radical of 1 to 10 carbon atoms, X is an oxygen atom or an alkylene radical of 2 to 5 carbon atoms, and Me is methyl. The subscript n is an integer of at least 10, m is independently at each occurrence equal to 0 or 1, p is an integer of at least 10, and q is an integer of 1 to 5. $R^1$ is a branching chain containing hydrolyzable radicals of the formula (3):

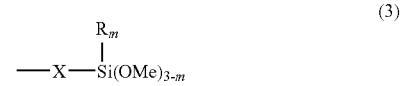

wherein R, Me, X and m are as defined above.

In formulae (1) and (2) representing the organopolysiloxanes (A) and formula (3), R is selected from substituted or unsubstituted, monovalent hydrocarbon radicals of 1 to 10 carbon atoms, preferably 1 to 6 carbon atoms, for example, alkyl radicals such as methyl, ethyl and propyl, cycloalkyl radicals such as cyclohexyl, alkenyl radicals such as vinyl and allyl, aryl radicals such as phenyl and tolyl, and substituted forms of the foregoing radicals in which some hydrogen atoms are replaced by halogen atoms or the like, such as 3,3,3-trifluoropropyl. A plurality of R's in formulae (1) to (3) may be the same or different.

X in formulae (1) to (3) is an oxygen atom or an alkylene radical of 2 to 5 carbon atoms. Exemplary alkylene radicals include ethylene, propylene, and butylene.

The subscript n is an integer of at least 10, preferably such an integer that the diorganopolysiloxane may have a viscosity at 25° C. in the range of 25 to 500,000 mPa·s, more preferably 500 to 100,000 mPa·s. The subscript m is independently equal to 0 or 1.

The subscript p is an integer of at least 10, preferably such an integer that the organopolysiloxane may have a viscosity at 25° C. in the range of 500 to 500,000 mPa·s, more preferably 1,000 to 100,000 mPa·s. The subscript q is an integer of 1 to 5, preferably 1 to 3. It is noted that the viscosity is measured at 25° C. by a rotational viscometer.

Component B

Component (B) is a non-reactive silicone oil, which is advantageously compounded for improving performance factors such as applicability and anti-webbing and for modifying rubber physical properties after curing. The preferred silicone oil is a trimethylsilyl end-capped polydimethylsiloxane. Also preferably the silicone oil has a viscosity at 25° C. in the range of 5 to 50,000 mPa·s, and more preferably 50 to 5,000 mPa·s.

As used herein and throughout the specification, the term "end-capped" means that a polysiloxane is capped with the referenced groups at both ends, unless otherwise stated.

The non-reactive silicone oil (B) is compounded in an amount of 1 to 50 parts by weight, and preferably 5 to 30 parts by weight per 100 parts by weight of component (A). Outside the range, too small an amount of the silicone oil may exacerbate applicability, especially resulting in the composition having an increased viscosity and becoming less dischargeable. Too large an amount may lead to degradation of rubber physical properties and a likelihood of oil bleeding.

Component C

Component (C) is zinc oxide which is surface treated with a silane or siloxane treating agent, which is essential for the composition to gain good magnesium adhesion and chemical resistance, especially durable physical properties and durable adhesion against engine oil, gear oil, and automatic transmission oil. Suitable silane or siloxane surface treating agents include polydimethylsiloxanes, cyclic siloxanes, alkoxysilanes, and the like. Of these, preferred are polydimethylsiloxanes, and more preferably methyl end-capped polydimethyl-

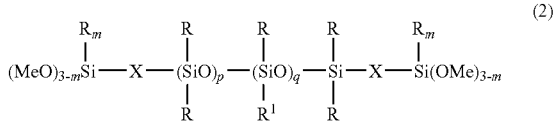

siloxanes. With respect to the surface treatment, 100 parts by weight of zinc oxide is preferably treated with 0.1 to 5 parts by weight, more preferably 1 to 3 parts by weight of the surface treating agent. The surface treatment may be performed by techniques known in the art.

The amount of component (C) compounded is 20 to 100 parts by weight, preferably 30 to 70 parts by weight per 100 parts by weight of component (A). In amounts of less than 20 pbw, good adhesion to magnesium alloys is lost and durable physical properties against chemicals are exacerbated. If the amount exceeds 100 pbw, the composition becomes too viscous to work.

Component D

Component (D) is heavy calcium carbonate which is surface treated with a paraffin treating agent, which is essential for the composition to gain good magnesium adhesion and chemical resistance, especially durable physical properties and durable adhesion against engine oil, gear oil, and automatic transmission oil. Suitable paraffin surface treating agents include straight or branched paraffins, preferably of 20 to 30 carbon atoms, which may be used alone or in admixture. With respect to the surface treatment, 100 parts by weight of calcium carbonate is preferably treated with 0.1 to 5 parts by weight, more preferably 1 to 2.5 parts by weight of the surface treating agent. The surface treatment may be performed by techniques known in the art.

The amount of component (D) compounded is 20 to 100 parts by weight, preferably 30 to 70 parts by weight per 100 parts by weight of component (A). In amounts of less than 20 pbw, good adhesion to magnesium alloys is lost and durable physical properties against chemicals are exacerbated. If the amount exceeds 100 pbw, the composition becomes too viscous to work and forms rubber with degraded mechanical properties.

In the composition, components (C) and (D) are preferably present in a weight ratio C/D between 0.5/1 and 1.5/1, and more preferably between 0.7/1 and 1.3/1. If the ratio C/D is outside the range, good adhesion to magnesium alloys may be lost.

Component E

Component (E) is an organosilicon compound having at least three, preferably three to six, hydrolyzable radicals each bonded to a silicon atom in the molecule or a partial hydrolyzate thereof. Examples of hydrolyzable radicals include ketoxime, alkoxy, acetoxy, and isopropenoxy radicals, with the alkoxy radicals being preferred.

Illustrative examples of the organosilicon compound (E) include alkoxysilanes such as methyltrimethoxysilane, vinyltrimethoxysilane, phenyltrimethoxysilane, and vinyltriethoxysilane; ketoximesilanes such as tetrakis(methyl ethyl ketoxime)silane, methyltris(dimethyl ketoxime)silane, methyltris(methyl ethyl ketoxime)silane, ethyltris(methyl ethyl ketoxime)silane, methyltris(methyl isobutyl ketoxime)silane, and vinyltris(methyl ethyl ketoxime)silane; acetoxysilanes such as methyltriacetoxysilane and vinyltriacetoxysilane; and isopropenoxysilanes such as methyltriisopropenoxysilane, vinyltriisopropenoxysilane, and phenyltriisopropenoxysilane; and partial hydrolyzates of the foregoing silanes.

The amount of component (E) compounded is 0.1 to 30 parts by weight, preferably 1 to 10 parts by weight per 100 parts by weight of component (A). Less than 0.1 pbw fails to provide sufficient shelf stability. If the amount exceeds 50 pbw, there is a likelihood that the cured product has degraded mechanical properties.

Component F

Component (F) is a silane coupling agent having at least one epoxy radical in the molecule, which is essential for the composition to gain good magnesium adhesion and chemical resistance, especially durable adhesion against engine oil, gear oil, automatic transmission oil, and long-life coolant. Examples of the silane coupling agent having at least one epoxy radical, preferably 1 to 5 epoxy radicals, in the molecule include β-(3,4-epoxycyclohexyl)ethyltrimethoxysilane, γ-glycidoxypropyltrimethoxysilane, and γ-glycidoxypropylmethyltriethoxysilane.

The amount of component (F) compounded is 0.1 to 10 parts by weight, preferably 1 to 5 parts by weight per 100 parts by weight of component (A). In amounts of less than 0.1 pbw, good adhesion to magnesium alloys is lost. Amounts in excess of 10 pbw are disadvantageous in cost.

Component G

Component (G) is a titanium chelate catalyst which causes the composition to cure. Examples of the titanium chelate catalyst include diisopropoxybis(ethyl acetoacetate) titanium, diisopropoxybis(acetylacetone)titanium, and dibutoxybis(methyl acetoacetate) titanium.

Component (G) is used in an effective amount as long as the composition is able to cure. Specifically, the amount of component (G) used is 0.1 to 10 parts by weight, preferably 0.5 to 8 parts by weight per 100 parts by weight of component (A). With too less amounts, it will take a longer time for the composition to cure. With too much amounts, the surface would harden too rapidly when the composition cures, deep cure is retarded, or the composition becomes shelf unstable.

Other Components

In addition to the foregoing components, any well-known additives and catalysts may be added to the inventive composition as long as they do not have negative impact on the cure at room temperature and the self-adherence to magnesium alloys of the composition. Suitable additives include thixotropic agents such as polyethers; colorants such as pigments and dyes; heat resistance modifiers such as red iron oxide, carbon powder, and cerium oxide; reinforcing fillers such as untreated fumed silica, precipitated silica, wet silica, talc, bentonite, magnesium oxide, aluminum oxide, and aluminum hydroxide; freeze resistance modifiers; rust preventives; and oil resistance modifiers such as potassium methacrylate. Optionally, mildew-proofing agents and antibacterial agents are added.

Preparation of Composition

Any desired method may be employed in preparing the organopolysiloxane composition of the invention. The composition may be prepared simply by mixing the predetermined amounts of the foregoing components in a conventional manner. The composition cures when it is allowed to stand at room temperature. With respect to the molding method and curing conditions, an appropriate combination for a particular composition may be selected from well-known methods and conditions.

The organopolysiloxane composition of the invention, when used in bonding and sealing of magnesium alloys, exhibits excellent self-adherence without a need for chemical treatment on the magnesium alloys.

The curing conditions for the organopolysiloxane composition may be similar to those employed for conventional RTV condensation curable silicone rubber compositions, and typically include holding or curing in an environment of 23±2° C. and RH 50±5% for 7 days.

The magnesium alloys to which the inventive composition is applicable include die casting, casting and malleable magnesium alloys, for example, AZ-31, AZ-91, AZ-60, AS-41, and AS-21 (by the ASTM standard nomenclature).

The organopolysiloxane composition of the invention is best suited as automobile sealants because it maintains excellent physical properties and adhesion against automobile-related fluids including engine oil, gear oil, automatic transmission oil, and long-life coolants.

EXAMPLE

Examples are given below by way of illustration and not by way of limitation. Note that all parts and percents are by weight, and the viscosity is measured at 25° C. by a rotational viscometer.

Synthesis Example 1

A three-necked flask (internal volume 2 L) equipped with a thermometer, stirrer, and condenser was charged with 2,500 g of α,ω-dimethylvinyl-dimethylpolysiloxane having a viscosity of 30,000 mPa·s, 11.9 g of trimethoxysilane, and 1.0 g of a 50% toluene solution of chloroplatinic acid as a catalyst. In $N_2$ stream, the ingredients were mixed for 9 hours at room temperature. Thereafter, the flask was heated at 100° C. under a vacuum of 10 mmHg to distill off the toluene diluent and the excess trimethoxysilane, yielding 2,350 g of a colorless clear liquid having a viscosity of 50,000 mPa·s and a nonvolatile content of 99.9%. The liquid was mixed with tetrapropyltitanate in a ratio of 100:1, whereupon it did not thicken immediately, but cured over one day. It is seen from this fact that methyltrimethoxysilane added to the vinyl radical at the polymer end. This is designated Polymer A.

Example 1

Composition 1 was prepared by blending 25 parts of methyl end-capped polydimethylsiloxane in 100 parts of Polymer A, adding 50 parts of zinc oxide surface treated with methyl end-capped polydimethylsiloxane as (C), 50 parts of heavy calcium carbonate surface treated with paraffin as (D) (weight ratio C/D=1.0), and 10 parts of carbon powder to the blend, mixing on a mixer, further adding thereto 4 parts of methyltrimethoxysilane, 2.5 parts of diisopropoxy-bis(acetylacetonato)titanium, and 2 parts of γ-glycidoxypropyltrimethoxysilane, and thoroughly mixing the ingredients in a reduced pressure.

Comparative Example 1

Composition 2 was prepared as in Example 1 except that a hydroxyl end-capped polydimethylsiloxane was used instead of Polymer A.

Comparative Example 2

Composition 3 was prepared as in Example 1 except that 50 parts of zinc oxide surface treated with methyl end-capped polydimethylsiloxane as (C) was omitted.

Comparative Example 3

Composition 4 was prepared as in Example 1 except that 56 parts of heavy calcium carbonate surface treated with paraffin as (D) was omitted.

Comparative Example 4

Composition 5 was prepared as in Example 1 except that 2 parts of γ-glycidoxypropyltrimethoxysilane was omitted.

Comparative Example 5

Composition 6 was prepared as in Example 1 except that 120 parts of zinc oxide surface treated with methyl end-capped polydimethylsiloxane as (C) and 10 parts of heavy calcium carbonate surface treated with paraffin as (D) were used in a weight ratio C/D of 12.0.

Comparative Example 6

Composition 7 was prepared as in Example 1 except that 10 parts of zinc oxide surface treated with methyl end-capped polydimethylsiloxane as (C) and 120 parts of heavy calcium carbonate surface treated with paraffin as (D) were used in a weight ratio C/D of 0.08.

Each of these silicone rubber compositions was cast into a mold frame of 2 mm high and cured at 23° C. and RH 50% for 7 days into a rubber sheet of 2 mm thick. The rubber physical properties (hardness, elongation at break, tensile strength) of the 2-mm rubber sheet were measured according to JIS K6249. The results are shown in Table 1.

Using these silicone rubber compositions and magnesium alloy plates (AZ-31) of 25 mm wide and 100 mm long, shear bond strength specimens having a bonded area of 2.5 $mm^2$ and an adhesive thickness of 1 mm were assembled. After curing at 23° C. and RH 50% for 7 days, the specimens were tested for measuring shear bond strength and percent cohesive failure. The results are also shown in Table 1.

Separately the rubber sheets were subjected to a chemical resistance test by immersing them in engine oil, 50% long-life coolant aqueous solution, automatic transmission oil, and gear oil at 100° C. for 7 days. After the test, rubber physical properties were measured as described above. The results are also shown in Table 1.

TABLE 1

|  |  | Example 1 | Comparative Example | | | | | |
|---|---|---|---|---|---|---|---|---|
|  |  |  | 1 | 2 | 3 | 4 | 5 | 6 |
| Initial physical properties | Hardness (Durometer A) | 35 | 28 | 25 | 30 | 34 | 37 | 30 |
|  | Elongation at break (%) | 390 | 450 | 250 | 350 | 420 | 400 | 320 |
|  | Tensile strength (MPa) | 2.0 | 1.8 | 1.5 | 1.8 | 2.1 | 2.1 | 1.8 |
|  | AZ-31 shear strength (MPa) | 1.8 | 1.2 | 0.3 | 0.2 | UM | 0.5 | 0.3 |

TABLE 1-continued

|  |  | Example 1 | Comparative Example | | | | | |
|---|---|---|---|---|---|---|---|---|
|  |  |  | 1 | 2 | 3 | 4 | 5 | 6 |
|  | AZ-31 cohesive failure (%) | 100 | 50 | 0 | 0 | UM | 10 | 0 |
| Resistance to engine oil @100° C./ 7 days | Hardness (Durometer A) | 11 | 8 | 5 | 10 | 12 | 13 | 10 |
|  | Elongation at break (%) | 570 | 670 | 400 | 450 | 550 | 550 | 500 |
|  | Tensile strength (MPa) | 1.7 | 1.0 | 0.5 | 1.0 | 1.8 | 1.3 | 1.2 |
|  | AZ-31 shear strength (MPa) | 1.0 | 0.2 | 0.1 | 0.1 | UM | 0.3 | 0.1 |
|  | AZ-31 cohesive failure (%) | 100 | 0 | 0 | 0 | UM | 0 | 0 |
| Resistance to long-life coolant @100° C./ 7 days | Hardness (Durometer A) | 28 | UM | 17 | 22 | 25 | 29 | 25 |
|  | Elongation at break (%) | 410 | UM | 300 | 320 | 430 | 400 | 340 |
|  | Tensile strength (MPa) | 2.1 | UM | 1.0 | 1.2 | 1.9 | 1.8 | 1.5 |
|  | AZ-31 shear strength (MPa) | 1.5 | UM | UM | UM | UM | UM | UM |
|  | AZ-31 cohesive failure (%) | 100 | UM | UM | UM | UM | UM | UM |
| Resistance to transmission oil @100° C./ 7 days | Hardness (Durometer A) | 19 | 10 | 4 | 7 | 16 | 20 | 15 |
|  | Elongation at break (%) | 410 | 700 | 300 | 480 | 450 | 500 | 460 |
|  | Tensile strength (MPa) | 2.4 | 0.8 | 0.4 | 0.9 | 1.6 | 1.9 | 1.3 |
|  | AZ-31 shear strength (MPa) | 1.3 | 0.3 | 0.1 | 0.1 | UM | 0.4 | 0.1 |
|  | AZ-31 cohesive failure (%) | 100 | 10 | 0 | 0 | UM | 0 | 0 |
| Resistance to gear oil @100° C./ 7 days | Hardness (Durometer A) | 22 | 15 | 7 | 10 | 21 | 25 | 17 |
|  | Elongation at break (%) | 380 | 540 | 290 | 340 | 430 | 400 | 380 |
|  | Tensile strength (MPa) | 2.2 | 0.9 | 0.5 | 0.8 | 1.8 | 1.6 | 1.3 |
|  | AZ-31 shear strength (MPa) | 1.3 | 0.2 | 0.1 | 0.1 | UM | 0.2 | 0.1 |
|  | AZ-31 cohesive failure (%) | 100 | 0 | 0 | 0 | UM | 0 | 0 |

UM: unmeasurable

Japanese Patent Application No. 2006-024108 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organopolysiloxane composition for magnesium alloy bonding, having improved chemical resistance, said composition comprising (A) 100 parts by weight of an organopolysiloxane having the general formula (1):

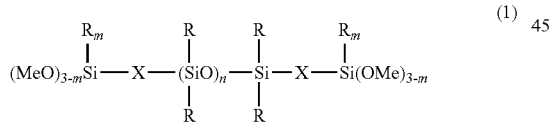

wherein R is each independently a substituted or unsubstituted monovalent hydrocarbon radical of 1 to 10 carbon atoms, X is an oxygen atom or an alkylene radical of 2 to 5 carbon atoms, Me is methyl, n is an integer of at least 10, and m is each independently 0 or 1, or an organopolysiloxane having the general formula (2):

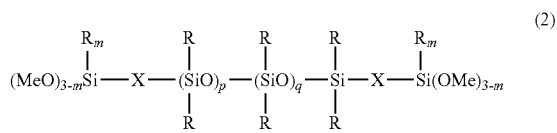

wherein R, Me, X and m are as defined above, p is an integer of at least 10, q is an integer of 1 to 5, and $R^1$ is a branching chain containing hydrolyzable radicals of the formula (3):

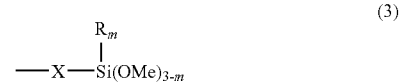

wherein R, Me, X and m are as defined above, or a mixture thereof, (B) 1 to 50 parts by weight of a non-reactive silicone oil, (C) 20 to 100 parts by weight of zinc oxide which is surface treated with a silane or siloxane treating agent, (D) 20 to 100 parts by weight of heavy calcium carbonate which is surface treated with a paraffin treating agent, (E) 0.1 to 30 parts by weight of an organosilicon compound having at least three hydrolyzable radicals each bonded to a silicon atom in the molecule or a partial hydrolyzate thereof, (F) 0.1 to 10 parts by weight of a silane coupling agent having at least one epoxy radical in the molecule, and (G) an effective amount of a titanium chelate catalyst, wherein components (C) and (D) are present in a weight ratio C/D between 0.5 and 1.5.

2. The organopolysiloxane composition of claim 1, for use as automobile sealant.

3. A method for bonding a silicone rubber to magnesium alloy comprising the steps of supplying an organopolysiloxane composition for magnesium alloy bonding, having improved chemical resistance to the magnesium alloy, said composition comprising (A) 100 parts by weight of an organopolysiloxane having the general formula (1):

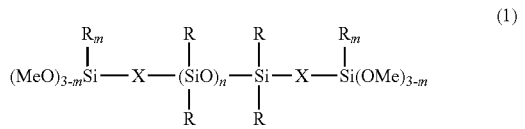

(1)

wherein R is each independently a substituted or unsubstituted monovalent hydrocarbon radical of 1 to 10 carbon atoms, X is an oxygen atom or an alkylene radical of 2 to 5 carbon atoms, Me is methyl, n is an integer of at least 10, and m is each independently 0 or 1, or an organopolysiloxane having the general formula (2):

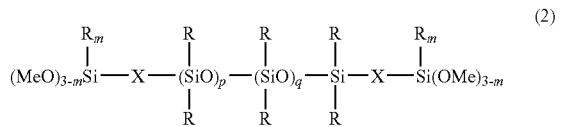

(2)

wherein R, Me, X and m are as defined above, p is an integer of at least 10, q is an integer of 1 to 5, and $R^1$ is a branching chain containing hydrolyzable radicals of the formula (3):

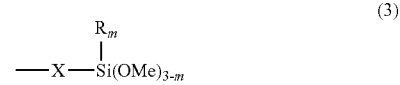

(3)

wherein R, Me, X and m are as defined above, or a mixture thereof, (B) 5 to 50 parts by weight of a non-reactive silicone oil,
(C) 20 to 100 parts by weight of zinc oxide which is surface treated with a silane or siloxane treating agent,
(D) 20 to 100 parts by weight of heavy calcium carbonate which is surface treated with a paraffin treating agent,
(E) 0.1 to 30 parts by weight of an organosilicon compound having at least three hydrolyzable radicals each bonded to a silicon atom in the molecule or a partial hydrolyzate thereof,
(F) 0.1 to 10 parts by weight of a silane coupling agent having at least one epoxy radical in the molecule, and
(G) an effective amount of a titanium chelate catalyst, wherein components (C) and (D) are present in a weight ratio C/D between 0.5 and 1.5, and curing the composition, thereby the cured composition and the magnesium alloy are bonded.

* * * * *